(12) United States Patent
Kawanishi

(10) Patent No.: US 10,837,821 B2
(45) Date of Patent: Nov. 17, 2020

(54) COMBINATION WEIGHING APPARATUS INCLUDING SMALL AND LARGE UNITS INCLUDING WEIGHING HOPPERS

(71) Applicant: YAMATO SCALE CO., LTD., Akashi (JP)

(72) Inventor: Shozo Kawanishi, Nishinomiya (JP)

(73) Assignee: YAMATO SCALE CO., LTD., Akashi (JP)

( * ) Notice: Subject to any disclaimer, the term of this patent is extended or adjusted under 35 U.S.C. 154(b) by 251 days.

(21) Appl. No.: 15/760,192

(22) PCT Filed: Jul. 13, 2017

(86) PCT No.: PCT/JP2017/025491
§ 371 (c)(1),
(2) Date: Mar. 14, 2018

(87) PCT Pub. No.: WO2019/012639
PCT Pub. Date: Jan. 17, 2019

(65) Prior Publication Data
US 2019/0137323 A1 May 9, 2019

(51) Int. Cl.
*G01G 19/393* (2006.01)
*G01G 13/18* (2006.01)
*G01G 13/24* (2006.01)

(52) U.S. Cl.
CPC .......... *G01G 13/18* (2013.01); *G01G 13/242* (2013.01); *G01G 19/393* (2013.01)

(58) Field of Classification Search
CPC ..... G01G 13/18; G01G 13/242; G01G 19/393
See application file for complete search history.

(56) References Cited

U.S. PATENT DOCUMENTS 4,846,291 A * 7/1989 Osawa ................ G01G 13/18
177/25.18
4,874,048 A * 10/1989 Kawanishi .......... G01G 13/024
177/25.18
(Continued)

FOREIGN PATENT DOCUMENTS

CN 1139205 A 1/1997
CN 101061376 A 10/2007
(Continued)

*Primary Examiner* — Randy W Gibson
(74) *Attorney, Agent, or Firm* — Alleman Hall Creasman & Tuttle LLP

(57) ABSTRACT

A combination weighing apparatus including a plurality of units arranged to form a circumference in a horizontal direction, wherein the plurality of units include weighing hoppers, each of which holds, weighs and discharges the object. The combination weighing apparatus comprises at least one small unit and at least one large unit, and: each of the weighing hoppers is a single-chamber weighing hopper or a double-chamber weighing hopper, the small unit includes the single-chamber weighing hopper and does not include the double-chamber weighing hopper, and the large unit includes the double-chamber weighing hopper and does not include the single-chamber weighing hopper; and/or some of the plurality of units include memory hoppers each of which is disposed below the weighing hopper, holds the objects discharged from the weighing hopper and discharges the objects, the small unit does not include the memory hopper, and the large unit includes the memory hopper.

13 Claims, 6 Drawing Sheets

(56) References Cited

U.S. PATENT DOCUMENTS

| | | | | |
|---|---|---|---|---|
| 4,901,807 A | * | 2/1990 | Muskat | G01G 19/393 |
| | | | | 177/199 |
| 4,967,856 A | * | 11/1990 | Kawanishi | G01G 19/393 |
| | | | | 177/25.18 |
| 5,048,623 A | * | 9/1991 | Toyoda | G01G 19/393 |
| | | | | 177/25.18 |
| 5,910,646 A | * | 6/1999 | Kawanishi | G01G 19/393 |
| | | | | 177/25.18 |
| 5,981,882 A | * | 11/1999 | Kawanishi | G01G 19/393 |
| | | | | 177/25.18 |
| 2009/0294183 A1 | | 12/2009 | Kawanishi | |
| 2013/0292191 A1 | | 11/2013 | Nagai | |

FOREIGN PATENT DOCUMENTS

| | | |
|---|---|---|
| CN | 103026188 A | 4/2013 |
| EP | 1832858 A1 | 9/2007 |
| EP | 1845348 A1 | 10/2007 |
| JP | S63065322 A | 3/1988 |
| JP | 2002296099 A | 10/2002 |
| JP | 2007010448 A | 1/2007 |
| JP | 2007010488 A | 1/2007 |
| JP | 2014109079 A | 6/2014 |
| JP | 2014126389 A | 7/2014 |
| JP | 2017125767 A | 7/2017 |
| WO | 2007069544 A1 | 6/2007 |
| WO | 2018199319 A1 | 11/2018 |

\* cited by examiner

COMBINATION WEIGHING APPARATUS INCLUDING SMALL AND LARGE UNITS INCLUDING WEIGHING HOPPERS

TECHNICAL FIELD

The present invention relates to a combination weighing apparatus.

BACKGROUND ART

A combination weighing apparatus is configured to obtain a plurality of measured weight values, perform combination calculation, select a combination of the measured weight values, whose total weight is close to a target weight, and discharge objects of the selected combination.

Patent Literature 1 discloses a combination weighing apparatus including memory hoppers. The memory hoppers temporarily hold the objects weighed by the corresponding weighing hoppers. As a selection method of the objects which is used by a combination selection means, a method of selecting a combination of the objects from the objects held in the weighing hoppers and the objects held in the memory hoppers may be used.

Patent Literature 2 discloses a combination weighing apparatus including double-chamber weighing hoppers. Each of the double-chamber weighing hoppers is connected to a single weighing sensor and includes two weighing chambers. The two weighing chambers may be provided with gates which can be opened and closed independently of each other. In this configuration, the objects held in each of the weighing chambers can be independently discharged. In a case where the objects are supplied to the weighing hopper, the objects are supplied to one of the weighing chambers, and the weight of the objects supplied to that weighing chamber can be detected, based on a difference between detection values of the weighing sensors which are obtained before and after the objects are supplied to the weighing chamber. The combination calculation is performed by use of the detected weight values, and the objects are discharged from the selected weighing chamber. In this way, each of the weighing chambers can operate like an independent weighing hopper.

CITATION LIST

Patent Literature

Patent Literature 1: Japanese Laid-Open Patent Application Publication No. 2014-109079
Patent Literature 2: Japanese Laid-Open Patent Application Publication No. 2014-126389

SUMMARY OF INVENTION

According to an aspect of the disclosure, there is provided a combination weighing apparatus including a plurality of units arranged to form a circumference in a horizontal direction, wherein the plurality of units include weighing hoppers, respectively, each of the weighing hoppers being configured to hold, weigh and discharge objects, and each of the plurality of units is a small unit or a large unit, the combination weighing apparatus comprising: at least one small unit and at least one large unit, wherein the combination weighing apparatus meets at least one of the following two conditions (A) and (B): condition (A) in which each of the weighing hoppers is a single-chamber weighing hopper or a double-chamber weighing hopper, the small unit includes the single-chamber weighing hopper and does not include the double-chamber weighing hopper, and the large unit includes the double-chamber weighing hopper and does not include the single-chamber weighing hopper, and condition (B) in which some (one or more) of the plurality of units include memory hoppers each of which is disposed below the weighing hopper, holds the objects discharged from the weighing hopper and discharges the objects, the small unit does not include the memory hopper, and the large unit includes the memory hopper.

DESCRIPTION OF EMBODIMENTS

Figure 1:
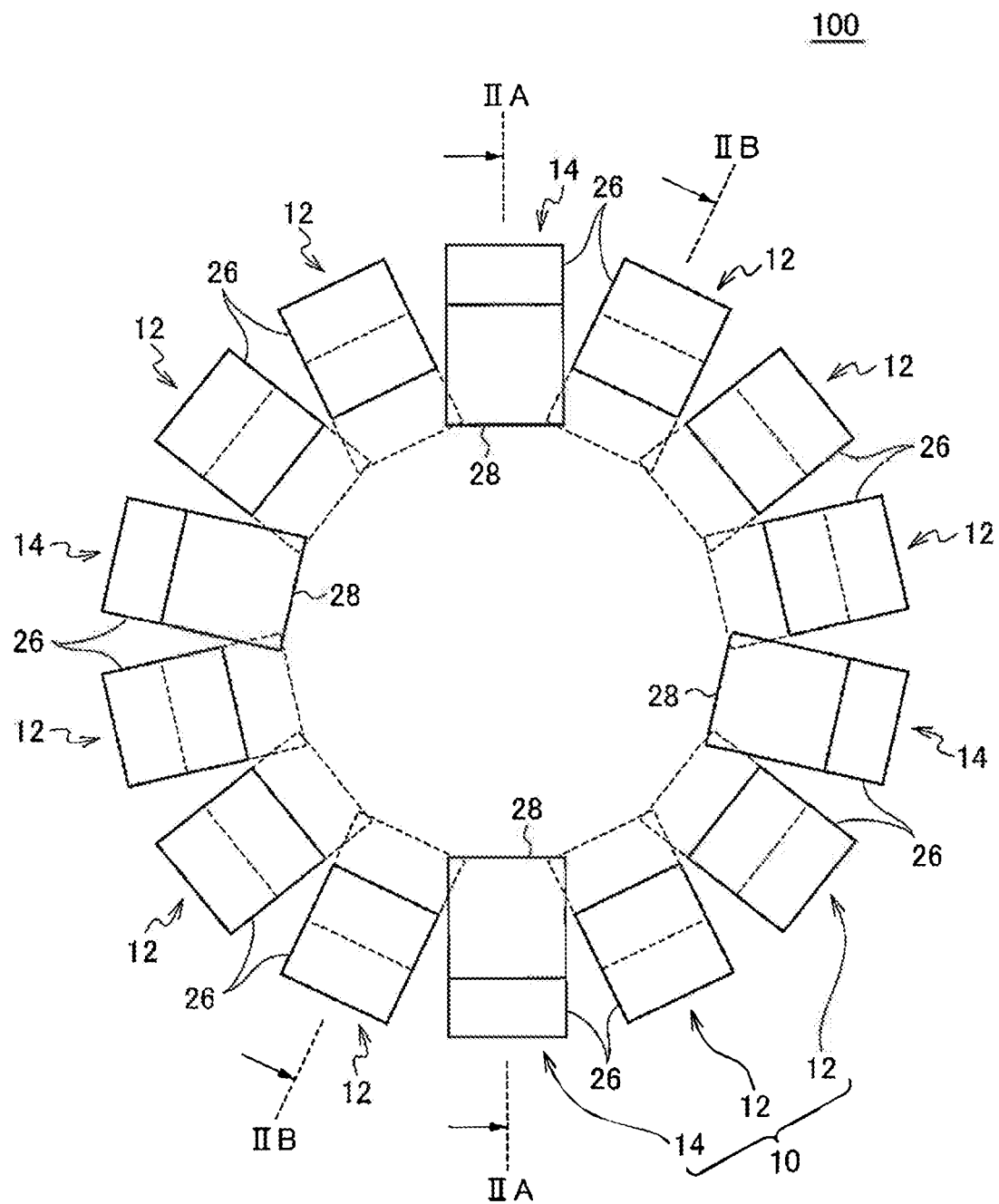
FIG. 1 is a schematic plan view showing a schematic configuration of a combination weighing apparatus according to Embodiment 1.

In a combination weighing apparatus, typically, weighing accuracy increases with an increase in the number of the measured weight values which participate in combination calculation. As defined herein, the phrase "weighing accuracy is high" indicates that a difference between a total (combination total weight) of the measured weight values which participate in an optimal combination selected as a result of the combination calculation and a target value (combination target weight) of the weight of objects discharged from the combination weighing apparatus is small.

To increase the number of the measured weight values, the number of the weighing hoppers may be increased. However, this causes problems that the size of the apparatus increases, a processing speed reduces, and manufacturing cost increases. The objects discharged from a plurality of hoppers selected as the combination slide on a collecting chute in a state in which the objects have a certain length (hereinafter this will be referred to as "string-out length" from the head to the tail. Then, the objects are fed into a packaging machine disposed downstream of the combination weighing apparatus. As a distance over which the objects slide on the collecting chute increases, the objects are more affected by a friction received from the collecting chute or the like, so that the string-out length increases. Therefore, it takes longer time for the objects with a longer string-out length to reach the packaging machine, in a case where a comparison is made for the objects with an equal amount (volume).

To prevent a situation in which the objects get stuck in a sealed portion while the packaging machine is performing sealing, it is necessary to secure a certain distance between the tail of the objects selected as a specified combination and discharged from the hoppers and the head of the objects selected at next time as another (next) combination and discharged from the hoppers (hereinafter this distance will be referred to as "product window"). If the string-out length is increased under the condition in which time required for a weighing cycle is constant, the product window is reduced, and the object may get stuck in the sealed portion. Product mix in which the objects of the specified combination and the objects of the next combination are mixed is likely to occur, and in this state the packaging machine cannot perform sealing. If the time required for one weighing cycle is increased to secure the product window, the processing speed of the combination weighing apparatus is reduced.

As should be appreciated from the above, the increase in the size of the combination weighing apparatus is undesirable, because the string-out length is increased, the product window is reduced, and the product mix may occur depending on the case. If the time required for the weighing cycle is increased to secure a required product window while dealing with the increased string-out length, a weighing speed is undesirably reduced. Under the circumstances, for example, if the number of the measured weight values can be increased without increasing the number of the weighing hoppers, to improve weighing accuracy while preventing the increase in the size of the combination weighing apparatus, advantages can be obtained.

As a method of increasing the measured weight values without increasing the number of the weighing hoppers, memory hoppers may be used. The objects, whose measured weight values have been obtained, are temporarily held in the memory hoppers, and the measured weight values of the memory hoppers participate in the combination calculation. In this way, the number of the measured weight values which participate in the combination calculation can be increased.

As another method of increasing the measured weight values without increasing the number of the weighing hoppers, double-chamber weighing hoppers may be used. The double-chamber weighing hopper is connected to a single weighing sensor and includes two weighing chambers. In a case where the objects are supplied to the weighing hopper, the objects are supplied to one of the two weighing chambers, the weight of the objects supplied to this weighing chamber is detected based on a difference between detection values of the weighing sensor which are obtained before and after the objects are supplied to the weighing chamber. The combination calculation is performed by use of the detected weight values, and the objects are discharged from the selected weighing chamber. In this way, one weighing hopper can operate like two weighing hoppers.

In the combination weighing apparatus, for each of the weighing hoppers, upstream constituents (linear feeder, feeding hopper, etc.) which feed the objects to each weighing hopper, and downstream constituents (memory hopper, etc.) which process the objects discharged from the weighing hopper and discharge the objects to an outside area of the apparatus, are provided to correspond to each other. Hereinafter, each of the weighing hoppers, the upstream constituents corresponding to each weighing hopper, and the downstream constituents corresponding to each weighing hopper will be collectively referred to as a unit. Each unit includes, for example, one linear feeder, one feeding hopper, and one weighing hopper. Or, each unit includes, for example, one feeding hopper, one weighing hopper, and one memory hopper.

The present inventors intensively studied the method of increasing the number of the measured weight values while preventing the increase in the size of the combination weighing apparatus. As a result, the present inventors discovered the following respects. If the memory hoppers are provided to correspond to the weighing hoppers, respectively, or the weighing hoppers are replaced by the double-chamber weighing hoppers, respectively, in a conventional combination weighing apparatus which does not include the memory hoppers and the double-chamber weighing hoppers, the size of the apparatus is increased. This is because it is necessary to increase a pitch between the hoppers to prevent interference between adjacent memory hoppers or between adjacent double-chamber weighing hoppers.

For example, the memory hopper is required to hold the objects with an amount (volume) equal to that of the objects held in the weighing hopper. The size of the memory hopper is approximately equal to that of the weighing hopper. In a case where the units are arranged to form a circumference in a horizontal direction, each memory hopper is disposed inward of the corresponding weighing hopper (on a side which is closer to a vertical axis passing through the center of the circumference). The size of the circumference formed by the memory hoppers is smaller than that of the weighing hoppers. For this reason, if an attempt is made to accommodate the memory hoppers which are equal in number to the weighing hoppers, the memory hoppers interfere with each other. If the memory hoppers are arranged while preventing interference between the memory hoppers, the diameter of the circumference formed by the memory hoppers is unavoidably increased, which leads to the increase in the size of the combination weighing apparatus.

In the double-chamber weighing hopper, each of the weighing chambers is required to hold the objects with an amount (volume) equal to that of the objects held in the weighing hopper. For this reason, the double-chamber weighing hopper has a size which is about twice as large as that of the conventional weighing hopper. In the conventional combination weighing apparatus, spacing (distance) between the weighing hoppers is set to a value which is as small as possible, to reduce the size of the apparatus. Therefore, if an attempt is made to accommodate the double-chamber weighing hoppers which are equal in number to the conventional weighing hoppers, the double-chamber weighing hoppers interfere with each other. If the double-chamber weighing hoppers are arranged while preventing interference between the double-chamber weighing hoppers, the diameter of the circumference formed by the double-chamber weighing hoppers is unavoidably increased, which leads to the increase in the size of the combination weighing apparatus.

The phrase "the hoppers interfere with each other" includes a case where gates of the hoppers interfere with each other when the gates are opened.

For the purpose of increasing the number of the measured weight values, it is not necessary to provide the memory hoppers corresponding to all of the weighing hoppers, or replace all of the weighing hoppers by the double-chamber weighing hoppers. The number of the measured weight values can be increased while suppressing the increase in the size of the apparatus, by providing the memory hoppers corresponding to some (one or more) of the weighing hoppers, or replace some of the weighing hoppers by the double-chamber weighing hoppers.

In other words, the number of the measured weight values can be increased while suppressing the increase in the size of the apparatus, by use of a configuration in which the unit including the memory hopper and the unit which does not include the memory hopper co-exist, or a configuration in which the unit including the double-chamber weighing hopper and the unit which does not include the double-chamber weighing hopper co-exist. Furthermore, the interference between the memory hoppers and/or the interference between the double-chamber weighing hoppers can be easily prevented by preventing the interference between the units each including the memory hopper and/or preventing the interference between the units each including double-chamber weighing hopper.

Specifically, in a combination weighing apparatus, a plurality of units are arranged to form a circumference in a horizontal direction. The plurality of units include weighing hoppers, respectively, each of which holds, weighs and discharges objects. Each of the plurality of units is a small unit or a large unit. The combination weighing apparatus comprises at least one small unit and at least one large unit, and meets at least one of the following two conditions (A) and (B):

condition (A) in which each of the weighing hoppers is a single-chamber weighing hopper or a double-chamber weighing hopper, the small unit includes the single-chamber weighing hopper and does not include the double-chamber weighing hopper, and the large unit includes the double-chamber weighing hopper and does not include the single-chamber weighing hopper, and condition (B) in which some (one or more) of the plurality of units include memory hoppers, each of which is disposed below the weighing hopper, holds the objects discharged from the weighing hopper and discharges the objects, the small unit does not include the memory hopper, and the large unit includes the memory hopper.

The existing combination weighing apparatus may be altered (modified). The existing combination weighing apparatus is defined as a combination weighing apparatus including a plurality of units arranged to form a circumference in a horizontal direction, in which each of the units includes a weighing hopper which holds, weighs, and discharges the objects, and does not include a memory hopper which is disposed below the weighing hopper, holds the objects discharged from the weighing hopper and discharges the objects. In the alteration, the memory hoppers are provided to correspond to only some of the weighing hoppers. Or, the memory hoppers may be provided in such a manner that both of the two adjacent units do not include the memory hoppers. In this configuration, the combination weighing apparatus which meets the condition (B) can be manufactured. This makes it possible to provide the manufacturing method of the altered (modified) combination weighing apparatus or an alteration method of the combination weighing apparatus.

Hereinafter, embodiments will be described with reference to the drawings. Hereinafter, throughout the embodiments and drawings, the same or corresponding constituents or members are designated by the same reference symbols and the constituents described once will not be described in repetition.

Embodiment 1

A first combination weighing apparatus according to Embodiment 1 is a combination weighing apparatus including a plurality of units arranged to form a circumference in a horizontal direction, wherein the plurality of units include weighing hoppers, respectively, each of the weighing hoppers being configured to hold, weigh and discharge objects, and each of the plurality of units is a small unit or a large unit, the combination weighing apparatus comprising: at least one small unit and at least one large unit, wherein the combination weighing apparatus meets at least one of the following two conditions (A) and (B):

condition (A) in which each of the weighing hoppers is a single-chamber weighing hopper or a double-chamber weighing hopper, the small unit includes the single-chamber weighing hopper and does not include the double-chamber weighing hopper, and the large unit includes the double-chamber weighing hopper and does not include the single-chamber weighing hopper, and condition (B) in which some (one or more) of the plurality of units include memory hoppers each of which is disposed below the weighing hopper, holds the objects discharged from the weighing hopper and discharges the objects, the small unit does not include the memory hopper, and the large unit includes the memory hopper.

In the above-described combination weighing apparatus, some of all of the units are selectively configured as the small units. In this way, the combination weighing apparatus which is compact and has a high performance can be realized.

In the above-described combination weighing apparatus, which meets the condition (A), the small unit may include the memory hopper and the large unit may not include the memory hopper. Or, in the above-described combination weighing apparatus, which meets the condition (B), the small unit may include the double-chamber weighing hopper and may not include the single-chamber weighing hopper, and the large unit may include the single-chamber weighing hopper and may not include the double-chamber weighing hopper.

In the above-described combination weighing apparatus, which meets the condition (A), each of the small unit and the large unit may include the memory hopper. In this configuration, the number of the measured weight values can be increased while preventing an increase in the size of the apparatus, compared to a configuration in which each of all of the units includes the memory hopper and the single-chamber weighing hopper.

In the above-described combination weighing apparatus, which meets the condition (B), each of the small unit and the large unit may include the double-chamber weighing hopper. In this configuration, the number of the measured weight values can be increased while preventing the increase in the size of the apparatus, compared to a configuration in which each of all of the units includes the memory hopper and the single-chamber weighing hopper.

In a second combination weighing apparatus according to Embodiment 1 which is according to the above-described first combination weighing apparatus, at least one small unit is disposed between two adjacent large units selected arbitrarily in the circumference so that the large units are not adjacent to each other in the circumferential direction.

In the above-described combination weighing apparatus, adjacent memory hoppers do not interfere with each other, and adjacent double-chamber weighing hoppers do not interfere with each other. The size of the whole of the combination weighing apparatus can be reduced compared to the combination weighing apparatus including only large units, and the number of the measured weight values can be increased compared to the combination weighing apparatus including only small units. Therefore, the combination weighing apparatus which is compact and has a high performance can be easily realized.

In a third combination weighing apparatus according to Embodiment 1 which is according to the above-described first or second combination weighing apparatus, the condition (B) is met, and collecting chutes are provided to correspond to the plurality of units, respectively. In the above-described combination weighing apparatus, a position at which the collecting chute corresponding to the large unit is disposed is adjusted so that the collecting chute does not interfere with the memory hopper. In this way, the size of the whole of the combination weighing apparatus is not increased. In this case, the positions of the collecting chutes may be set so that the upper end of the collecting chute corresponding to the large unit is more distant from a vertical axis passing through the center of the circumference than the upper end of the collecting chute corresponding to the small unit. In this configuration, the interference between the memory hopper and the collecting chute can be easily prevented.

In a fourth combination weighing apparatus according to Embodiment 1 which is according to any one of the above-described first to third combination weighing apparatuses, the condition (B) is met, and the weighing hopper corresponding to the memory hopper is configured to selectively discharge the objects to a proximal region or a distal region, with respect to a center of the circumference (to a region which is more distant from the center of the circumference or to a region which is closer to the center of the circumference). In this configuration, the interference between the weighing hoppers and the interference between the memory hoppers can be easily prevented. In this case, the memory hopper may be disposed closer to the vertical axis passing through the center of the circumference than the corresponding weighing hopper.

Figure 2A:
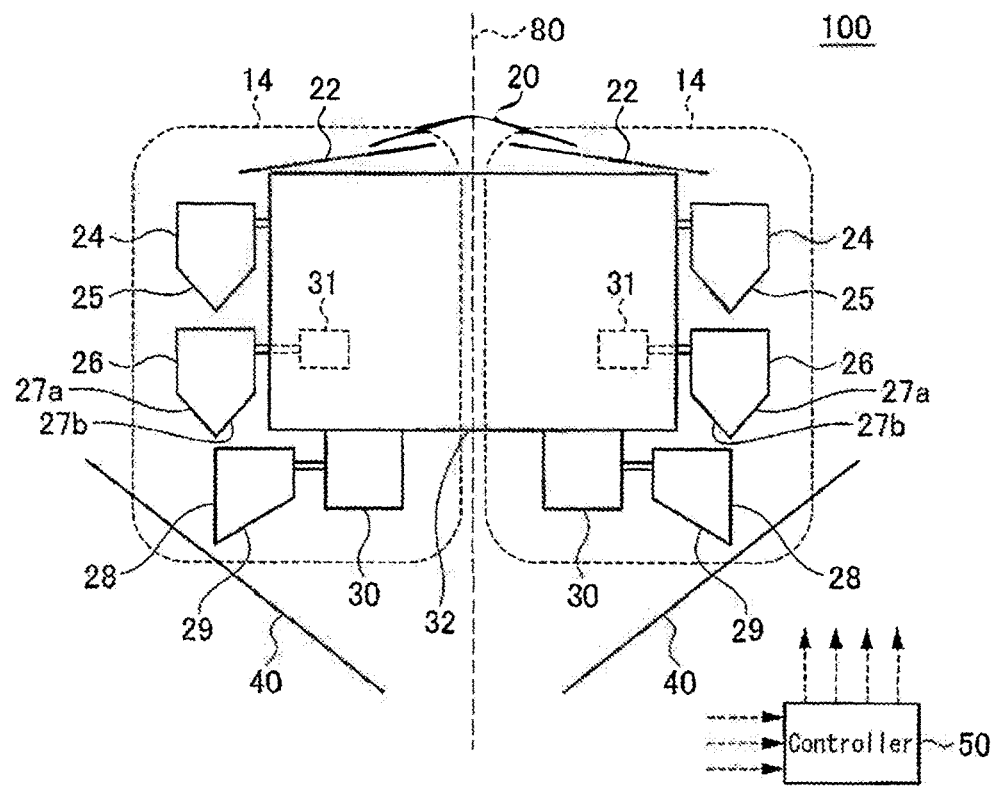
FIG. 2A is a schematic cross-sectional view taken along IIA-IIA of FIG. 1.
Figure 2B:
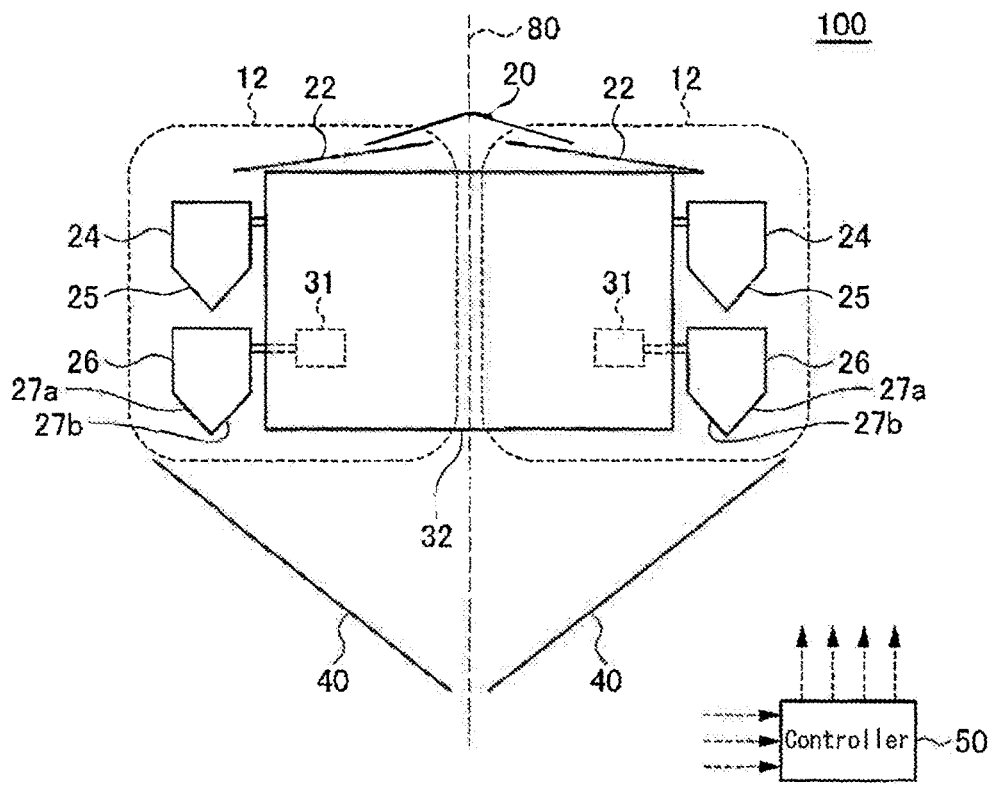
FIG. 2B is a schematic cross-sectional view taken along IIB-IIB of FIG. 1.

FIG. 1 is a schematic plan view showing the schematic configuration of the combination weighing apparatus according to Embodiment 1. FIG. 1 shows the arrangement of the weighing hoppers and the memory hoppers which are viewed from the underside of the combination weighing apparatus. FIG. 2A is a schematic cross-sectional view taken along 2A-2A of FIG. 1. FIG. 2B is a schematic cross-sectional view taken along 2B-2B of FIG. 1.

Hereinafter, an exemplary apparatus configuration which meets the condition (B), of a combination weighing apparatus 100 of Embodiment 1 will be described with reference to the drawings.

As shown in the drawings, the combination weighing apparatus 100 includes a plurality of units 10. The plurality of units 10 are arranged to form the circumference in the horizontal direction. The circumference may have a shape of a circle, an oval or a polygon. In the example of FIG. 1, the circumference is the circumference of the circle. Each of the units 10 includes a weighing hopper 26. The weighing hopper 26 is configured to hold, weigh, and discharge objects (objects to be weighed).

Some (one or more) of the units 10 include memory hoppers 28, respectively. The memory hopper 28 is disposed below the weighing hopper 26, holds the objects discharged from the weighing hopper 26 and discharges the objects. The phrase "the memory hopper 28 holds the objects discharged from the weighing hopper 26 and discharges the objects" means that the memory hopper 28 holds the total amount of the objects discharged from the weighing hopper 26 by one discharge operation of the weighing hopper 26 and discharges the total amount of the objects by one discharge operation of the memory hopper 28 (the same applies, including a case where the weighing hopper is the double-chamber weighing hopper).

In the shown example, drive units 30 are provided to correspond to the memory hoppers 28, respectively. The memory hoppers 28 include gates 29, respectively. Each of the memory hoppers 28 may be integrated with the corresponding drive unit 30. In the shown example, each of the memory hoppers 28 is disposed closer to a vertical axis 80 passing through the center of the circumference than the corresponding weighing hopper 26.

In the shown example, the weighing hopper 26 (the weighing hopper 26 included in the unit 10 including the memory hopper 28, the weighing hopper 26 included in a large unit 14) corresponding to the memory hopper 28 is configured to selectively discharge the objects to a proximal region or a distal region, with respect to a center of the circumference (to a region which is more distant from the center of the circumference or to a region which is closer to the center of the circumference). More specifically, the weighing hopper 26 includes a gate 27a which is opened to a side opposite to a center column 32 and a gate 27b which is opened toward the center column 32. Regarding the weighing hopper 26 which is not provided with the memory hopper 28, the gates need not be opened selectively in one of two directions, two gates may be opened simultaneously, or this weighing hopper 26 may include only one gate.

In the shown example, weighing sensors 31 are provided to correspond to the weighing hoppers 26, respectively. The weighing sensors 31 may be constituted by, for example, load cells, respectively.

Each of the units 10 is a small unit 12 or the large unit 14. The small unit 12 is the unit 10 which does not include the memory hopper 28. The large unit 14 is the unit 10 which includes the memory hopper 28. As shown in the drawings, the combination weighing apparatus 100 includes at least one small unit 12 and at least one large unit 14. In other words, the combination weighing apparatus 100 has a configuration in which the small unit 12 and the large unit 14 co-exist.

The configuration of the weighing hopper 26 is not particularly limited. For example, the weighing hopper 26 may be a single-chamber weighing hopper including one accommodating chamber for holding the objects or a double-chamber weighing hopper including two accommodating chambers for holding the objects. Both of the small unit and the large unit may include the double-chamber weighing hoppers. In this configuration, the number of the measured weight values can be increased while preventing the increase in the size of the apparatus, compared to a configuration in which each of all of the units includes the memory hopper and the single-chamber weighing hopper.

Although in the shown example, the number of the memory hopper 28 included in each of the large units 14 is one, this configuration is merely exemplary. Specifically, for example, the number of the memory hopper 28 included in each of the large units 14 may be two. Or, for example, the number of the memory hopper 28 included in some (one or more) of the large units 14 may be two, and the number of the memory hopper 28 included in some of the large units 14 may be one. In the configuration in which the large unit 14 includes two memory hoppers 28, these memory hoppers 28 may be arranged in a radial direction or the circumferential direction, with respect to the circumference formed by the units 10. Or, for example, some or all of the memory hoppers 28 may be double-chamber memory hoppers.

The number of the memory hoppers may be chosen so that the string-out length of the objects is shorter than that of the combination weighing apparatus including only the large units, or is equal to that of the combination weighing apparatus including only the small units. The number of the memory hoppers may be chosen so that the product window is larger in distance than that of the combination weighing apparatus including only the large units or is equal in distance to that of the combination weighing apparatus including only the small units.

In the shown example, at least one small unit 12 is disposed between two large units 14 selected arbitrarily in the circumference so that the large units 14 are not adjacent to each other in the circumferential direction. In the example shown in FIG. 1, two or three small units 12 are disposed between the large units 14. The number of the large units 14 is four, and the number of the small units 12 is ten. The large units 14 form two pairs. The two large units 14 forming each pair are positioned on opposite sides with respect to the vertical center axis of the combination weighing apparatus 100. This configuration is merely exemplary. For example, the large unit 14 and the small unit 12 may be arranged alternately in the circumferential direction.

A position relation between the large units 14 and the small units 12 may be chosen so that the string-out length is shorter than that of the combination weighing apparatus including only the large units, or is equal to that of the combination weighing apparatus including only the small units. The position relation between the large units 14 and the small units 12 may be chosen so that the product window is larger in distance than that of the combination weighing apparatus including only the large units or is equal in distance to that of the combination weighing apparatus including only the small units.

In the shown example, the combination weighing apparatus 100 includes the center column 32. Inside the center column 32, a drive unit for a top cone 20 (described later), drive units for linear feeders 22 (described later), drive units for feeding hoppers 24 (described later), drive units for the weighing hoppers 26, and the weighing sensors 31 (described later) are provided.

In the shown example, the feeding hoppers 24 are provided above the weighing hoppers 26 to correspond to the weighing hoppers 26, respectively. Each of the feeding hoppers 24 includes a gate 25. Note that the feeding hoppers 24 are not essential. For example, a feeder may directly feed the objects to the weighing hoppers 26.

In the shown example, the linear feeders 22 are disposed above the feeding hoppers 24, to correspond to the feeding hoppers 24, respectively, in such a manner that the linear feeders 22 are arranged radially around the vertical axis 80 of the combination weighing apparatus 100. Note that the linear feeders 22 are not essential and another feeding means may feed the objects to the feeding hoppers 24. Or, the feeding hoppers 24 may be omitted as well, and another feeding means may directly feed the objects to the weighing hoppers 26.

In the shown example, the top cone 20 is provided above the linear feeders 22 and on the vertical axis 80 of the combination weighing apparatus 100. Note that the top cone 20 is not essential, and a supply device may directly supply the objects to the linear feeders 22.

In the shown example, collecting chutes 40 are disposed below the weighing hoppers 26 to correspond to the weighing hoppers 26, respectively. Note that the collecting chutes 40 need not correspond to the weighing hoppers 26, respectively, in one-to-one correspondence. For example, one collecting chute 40 may be provided to correspond to a plurality of weighing hoppers 26 which are adjacent to each other.

In the shown example, the collecting chutes 40 are provided to correspond to the units 10, respectively. The collecting chutes 40 are disposed so that the upper end of the collecting chute 40 corresponding to the large unit 14 is more distant from the vertical axis 80 passing through the center of the circumference than the upper end of the collecting chute 40 corresponding to the small unit 12. In this configuration, it becomes possible to easily prevent interference between the memory hopper included in the large unit and the corresponding collecting chute.

In the shown example, the combination weighing apparatus 100 includes a controller 50. The controller 50 is communicatively connected to the drive unit of the top cone 20, the drive units of the linear feeders 22, the drive units of the feeding hoppers 24, the drive units of the weighing hoppers 26, the drive units 30 of the memory hoppers 28, and the weighing sensors 31. The controller 50 is configured to receive signals from the weighing sensors 31 to obtain the measured weight values and control the operations of the top cone 20, the linear feeders 22, and the gates 25, 27*a*, 27*b*, and 29. The controller 50 may include, for example, a processor section and a memory section. The processor section may be CPU. The memory section may be ROM and RAM. The controller 50 may include a single processor and perform a centralized control. Or, the controller 50 may include a plurality of processor sections and may perform a distributed control.

Hereinafter, the exemplary operation of the combination weighing apparatus 100 will be described with reference to the drawings. The operation described below may be performed, for example, in such a manner that the controller 50 executes programs stored in the memory section to control the constituents of the combination weighing apparatus 100.

A supply device which is not shown supplies the objects to the top cone 20. The top cone 20 is vibrated by an electromagnetic vibration device to supply the objects to each linear feeder 22. Each linear feeder 22 is vibrated by an electromagnetic vibration device to feed the objects to the corresponding feeding hopper 24 at a specified timing. Each feeding hopper 24 opens the gate 25 at a specified timing to feed the objects to the corresponding weighing hopper 26, in a case where the corresponding weighing hopper 26 is empty.

Each weighing sensor 31 detects the weight (hereinafter will be referred to as the measured weight value) of the objects supplied to the corresponding weighing hopper 26 and sends a detection value to the controller 50. Further, the weighing hopper 26 for which the memory hopper 28 is disposed therebelow, opens the gate 27*b* to shift the objects from the weighing hopper 26 to the memory hopper 28, in a case where the memory hopper 28 is empty. The measured weight value corresponding to the weighing hopper 26 is stored as the measured weight value corresponding to the memory hopper 28. After that, the feeding hopper 24 feeds the objects to the weighing hopper 26 which is empty, and the weighing sensor 31 sends the detection value to the controller 50 again. In this way, the controller 50 obtains the measured weight value.

The controller 50 performs combination calculation by use of the measured weight values corresponding to the weighing hoppers 26 and the memory hoppers 28. In the combination calculation, for example, the controller 50 calculates a combination total weight corresponding to each of combinations of the measured weight values (e.g., combinations each formed by 4 measured weight values selected from among 14 measured weight values corresponding to 10 weighing hoppers 26 and 4 memory hoppers 28). The controller 50 selects as an optimal combination, the combination of the measured weight values in which its combination total weight is larger than a combination target weight and closest to the combination target weight.

When the combination calculation completes, the controller 50 opens the gates 27*a* of the weighing hoppers 26 and the gates 29 of the memory hoppers 28, corresponding to the optimal combination, to discharge the objects to the collecting chutes 40.

After that, the objects are supplied to the weighing hoppers 26 and the memory hoppers 28 which are empty. In the shown example, a double-shift operation may be performed. In the double-shift operation, while the objects are supplied to the weighing hoppers 26 and the memory hoppers 28 which are empty, the combination calculation is performed by use of the measured weight values corresponding to the weighing hoppers 26 and the memory hoppers 28, which are other than the weighing hoppers 26 and the memory hoppers 28 which are empty, and the objects of the optimal combination are discharged.

In the combination weighing apparatus 100, the memory hoppers 28 as well as the weighing hoppers 26 can participate in the combination calculation. Therefore, the number of combinations which become candidates for the optimal combination in the combination calculation is increased, compared to a case where the memory hoppers 28 are not provided. Specifically, for example, it is assumed that the optimal combination is formed by use of 4 measured weight values in the double shift operation. In this case, if the memory hoppers 28 are not provided, 10 out of 14 weighing hoppers participate in the combination calculation. The number of combinations to be compared in the combination calculation is $_{10}C_4$=210. In contrast, if the objects are fed to and held in all of the 4 memory hoppers 28 in the combination weighing apparatus 100, 10 weighing hoppers and 4 memory hoppers participate in the combination calculation. The number of combinations to be compared in the combination calculation is $_{14}C_4$=1001 at maximum. In accordance with the combination weighing apparatus 100, it is highly probable that the combination total weight which is closer to the combination target weight can be obtained. As a result, the weighing accuracy is improved.

In the combination weighing apparatus 100, the memory hoppers 28 as well as the weighing hoppers 26 can participate in the combination calculation. Therefore, the number of combinations which become candidates for the optimal combination in the combination calculation is increased, compared to a case where the memory hoppers 28 are not provided. Specifically, for example, it is assumed that the optimal combination is formed by use of 4 measured weight values in the double shift operation. In this case, if the memory hoppers 28 are not provided, 10 out of 14 weighing hoppers participate in the combination calculation. The number of combinations to be compared in the combination calculation is $_{10}C_4$=210. In contrast, if the objects are fed to and held in all of the 4 memory hoppers 28 in the combination weighing apparatus 100, 10 weighing hoppers and 4 memory hoppers participate in the combination calculation. The number of combinations to be compared in the combination calculation is $_{14}C_4$=1001 at maximum. In accordance with the combination weighing apparatus 100, it is highly probable that the combination total weight which is closer to the combination target weight can be obtained. As a result, the weighing accuracy is improved.

In the example of FIG. 1, broken lines indicate virtual arrangement of the memory hoppers 28 in a case where the memory hoppers 28 are disposed below all of the weighing hoppers 26. In that case, as can be seen from FIG. 1, the memory hoppers 28 interfere with each other. Therefore, the memory hoppers 28 cannot be arranged. As possible options capable of solving this problem, the memory hoppers 28 are not provided, or the weighing hoppers 26 are arranged at a larger pitch so that the memory hoppers 28 do not interfere with each other. However, in the former option, the weighing accuracy cannot be improved, while in the latter option, the size of the whole of the combination weighing apparatus is increased.

In the combination weighing apparatus 100, each of the units 10 is the small unit 12 which does not include the memory hopper 28 or the large unit 14 including the memory hopper 28. At least one small unit 12 is disposed between two large units 14 selected arbitrarily so that the large units 14 are not adjacent to each other in the circumferential direction.

In this arrangement, the memory hoppers 28 can be provided while preventing interference between the memory hoppers 28. In this way, the memory hoppers 28 can be provided without changing the pitch of the weighing hoppers 26. As a result, the weighing accuracy can be improved while preventing the increase in the size of the combination weighing apparatus.

Although in the example shown in FIG. 1, 4 memory hoppers 28 are provided, the memory hoppers 28 with a different number may be provided. The number of the memory hoppers 28 may be any of natural numbers which is ½ or less of the number of units. In other words, the number of the memory hoppers 28 may be set to an integer which is 1 or more and ½ or less of the number of units. For example, in a case where the number of the units 10 is 14 as shown in FIG. 1, the number of the memory hoppers 28 may be set to an integer which is 1 or more and 7 or less. The number of the memory hoppers 28 to be provided may be suitably set in view of a desired weighing accuracy, allowable cost, or the like.

Although in the example shown in FIGS. 2A and 2B, the drive units 30 are disposed outside the center column 32, the drive units 30 may be disposed inside the center column 32. In this case, the lower end of the center column 32 may be lower than that of the example shown in FIGS. 2A and 2B.

Alternatively, by adjusting the positions (e.g., positions in the circumferential direction) of the memory hoppers 28, some (one or more) of the large units 14 may be adjacent to each other in the circumferential direction.

Embodiment 2

In a fifth combination weighing apparatus according to Embodiment 2, which is according to the combination weighing apparatus according to Embodiment 1, the condition (A) is met, and the double-chamber weighing hopper includes two weighing chambers disposed adjacently to each other along the circumference.

Figure 3:
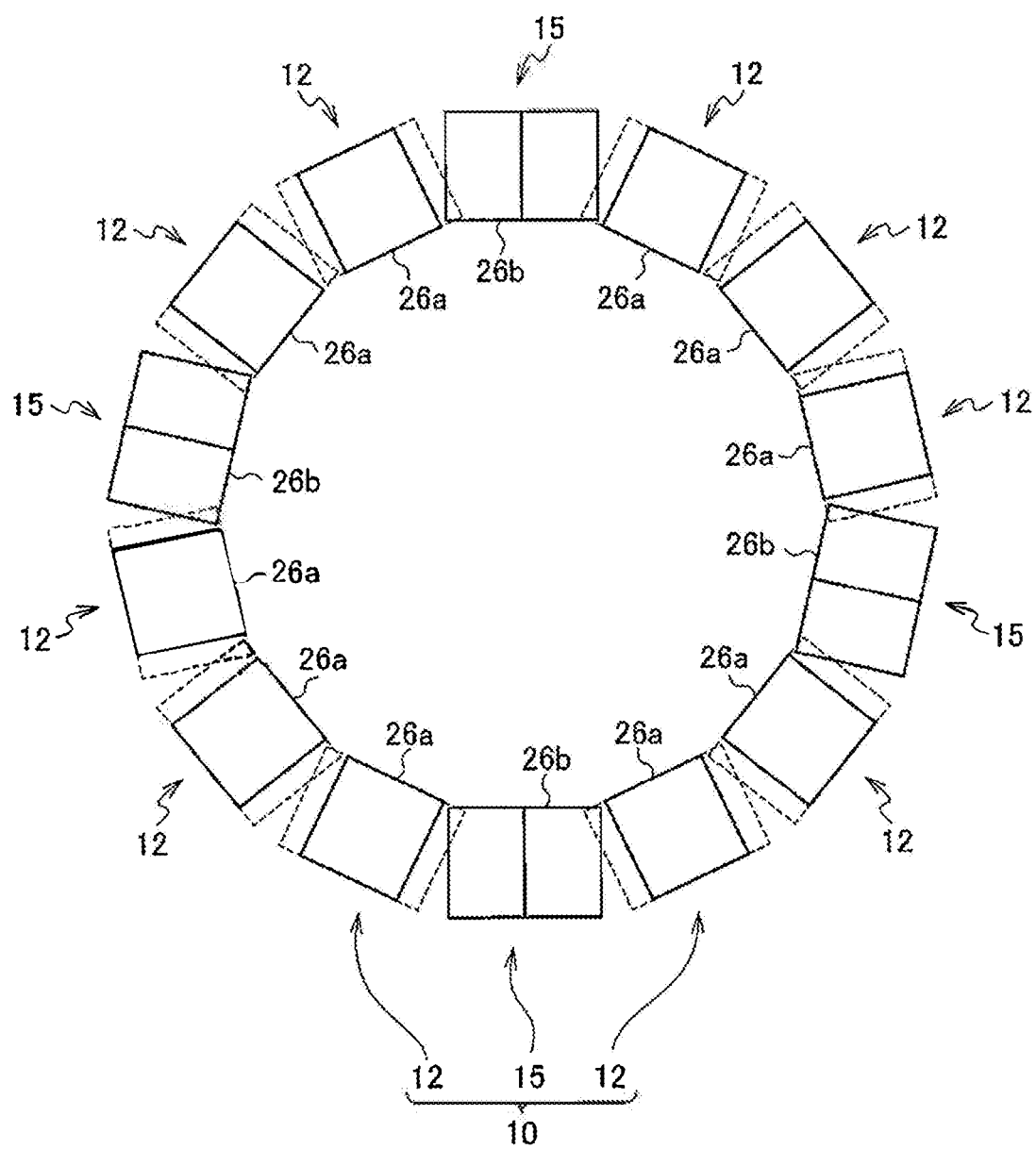
FIG. 3 is a schematic plan view showing a schematic configuration of a combination weighing apparatus according to Embodiment 2.
Figure 4:
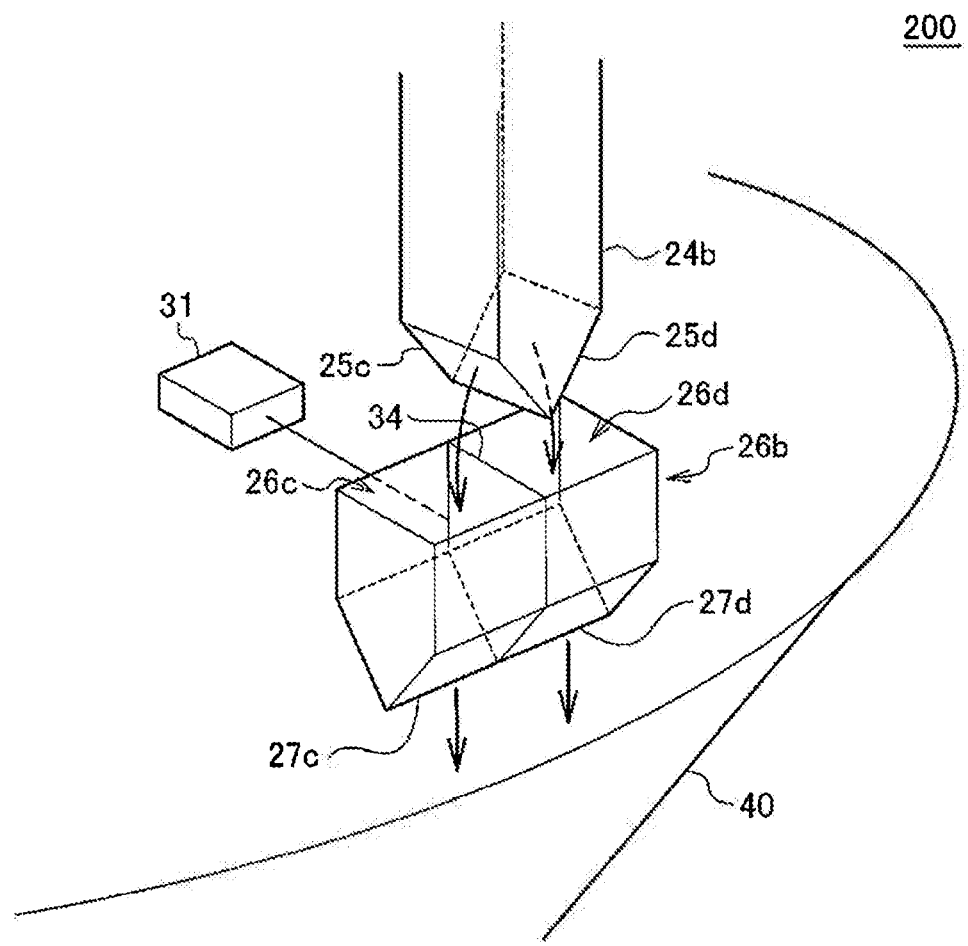
FIG. 4 is a schematic partial view showing a relation between a feeding hopper and a weighing hopper in a large unit of the combination weighing apparatus according to Embodiment 2.

FIG. 3 is a schematic plan view showing the schematic configuration of the combination weighing apparatus according to Embodiment 2. FIG. 3 shows the arrangement of the weighing hoppers which is viewed from the underside of the combination weighing apparatus. FIG. 4 is a schematic partial view showing a relation between the feeding hopper and the weighing hopper in the large unit of the combination weighing apparatus according to Embodiment 2.

The cross-sectional configuration of the combination weighing apparatus according to Embodiment 2 is identical to that of FIG. 2B except that some (one or more) of the weighing hoppers 26 are replaced by double-chamber weighing hoppers 26b, and each of feeding hoppers 24b corresponding to the double-chamber weighing hoppers 26b is configured to selectively feed the objects to each of the two weighing chambers. Therefore, the cross-sectional configuration of the combination weighing apparatus according to Embodiment 2 is not shown.

A combination weighing apparatus 200 according to Embodiment 2 includes the plurality of units 10 arranged to form the circumference in the horizontal direction, each of the units 10 includes the weighing hopper which holds, weighs and discharges the objects, and each of the units 10 is the small unit 12 or the large unit 15, as in the combination weighing apparatus 100 according to Embodiment 1. The combination weighing apparatus 200 includes at least one small unit 12 and at least one large unit 15. In brief, the combination weighing apparatus 200 has a configuration in which the small unit 12 and the large unit 15 co-exist.

In the example shown in FIG. 3, at least one small unit 12 is disposed between two large units 15 selected arbitrarily in the circumference so that the large units 15 are not adjacent to each other in the circumferential direction.

Each of the weighing hoppers is a single-chamber weighing hopper 26a or the double-chamber weighing hopper 26b. The small unit 12 includes the single-chamber weighing hopper 26a and does not include the double-chamber weighing hopper 26b. The large unit 15 includes the double-chamber weighing hopper 26b and does not include the single-chamber weighing hopper 26a. The lateral width of the double-chamber weighing hopper 26b is larger than that of the single-chamber weighing hopper 26a. The lateral width is defined as a length in the circumferential direction.

Both of the small unit 12 and the large unit 15 may include the memory hoppers. In this configuration, the number of the measured weight values can be increased while preventing the increase in the size of the apparatus, compared to a configuration in which each of all of the units includes the memory hopper and the single-chamber weighing hopper.

The double-chamber weighing hopper 26b includes a separating plate 34 in a center thereof. Weighing chambers 26c, 26d are provided on both sides of this separating plate. In this configuration, the objects held in the weighing chambers 26c, 26d are not mixed inside the double-chamber weighing hopper 26b. A gate 27c is provided at the underside of the weighing chamber 26c. A gate 27d is provided at the underside of the weighing chamber 26d. When the gate 27c is opened, the objects held in the weighing chamber 26c are discharged. When the gate 27d is opened, the objects held in the weighing chamber 26d are discharged.

The single-chamber weighing hopper 26a and the corresponding feeding hopper may be configured as in the weighing hopper 26 and the feeding hopper 24 of Embodiment 1 and will not be described in repetition.

The feeding hopper 24b disposed above the double-chamber weighing hopper 26b is configured to selectively open the gate 25c or the gate 25d in one of the two directions along the circumferential direction. When the gate 25c is opened, the objects held in the feeding hopper 24b are fed to the weighing chamber 26c (one of the weighing chambers) of the double-chamber weighing hopper 26b. When the gate 25d is opened, the objects held in the feeding hopper 24b are fed to the weighing chamber 26d (the other weighing chamber) of the double-chamber weighing hopper 26b.

The combination weighing apparatus 200 may include the top cone 20, the linear feeders 22, the center column 32, the collecting chutes 40, and the controller 50. The top cone 20, the linear feeders 22, the center column 32, the collecting chutes 40, and the controller 50 may be configured as in those of Embodiment 1, and detailed description of them is omitted.

Hereinafter, the operation of the combination weighing apparatus 200 will be described with reference to the drawings. The operation described below may be performed, for example, in such a manner that the controller 50 executes programs stored in the memory section to control the constituents of the combination weighing apparatus 200.

The operation performed when the supply device supplies the objects to the feeding hopper is similar to that of embodiment 1 and will not be described in repetition. The feeding hopper corresponding to the single-chamber weighing hopper 26a operates like the feeding hopper 24 of Embodiment 1. The feeding hopper 24b corresponding to the double-chamber weighing hopper 26b operates as follows.

Specifically, when the weighing chamber 26c of the two weighing chambers included in the double-chamber weighing hopper 26b corresponding to the feeding hopper 24b is empty, the gate 25c is opened. By this opening operation, the objects held in the feeding hopper 24b are fed to the weighing chamber 26c. After that, the weighing sensor 31 detects the weight value of the double-chamber weighing hopper 26b and sends the detection value to the controller 50. The controller 50 obtains the weight value (measured weight value) of the objects held in the weighing chamber 26c by subtracting the weight value of the double-chamber weighing hopper 26b which is obtained before the objects are supplied to the weighing chamber 26c, from the weight value of the double-chamber weighing hopper 26b which is obtained after the objects are supplied to the weighing hopper 26c.

Or, when the weighing chamber 26d is empty, the gate 25d is opened. By this opening operation, the objects held in the feeding hopper 24b are fed to the weighing chamber 26d. After that, the weighing sensor 31 detects the weight value of the double-chamber weighing hopper 26b and sends the detection value to the controller 50. The controller 50 obtains the weight value (measured weight value) of the objects held in the weighing chamber 26d by subtracting the weight value of the double-chamber weighing hopper 26b which is obtained before the objects are supplied to the weighing chamber 26d, from the weight value of the double-chamber weighing hopper 26b which is obtained after the objects are supplied to the weighing chamber 26d.

The controller 50 performs the combination calculation by use of the measured weight values of the single-chamber weighing hoppers 26a and the weighing chambers 26c, 26d of the double-chamber weighing hoppers 26b. The combination calculation is similar to that of Embodiment 1 and detailed description is omitted.

When the combination calculation completes, the controller 50 opens the gate 27a of the weighing hopper 26 and the gates 27c, 27d of the weighing chambers 26c, 26d, corresponding to the optimal combination, to discharge the objects to the collecting chutes 40.

After that, the objects are supplied to the weighing hopper 26 and the weighing chambers 26c, 26d which are empty. In the shown example, the double-shift operation may be performed. In this case, while the objects are supplied to the weighing hopper 26 and the weighing chambers 26c, 26d, the combination calculation is performed by use of the measured weight values corresponding to the weighing hoppers 26 and the weighing chambers 26c, 26d, which are other than the weighing hopper 26 and the weighing chambers 26c, 26d which are empty, and the objects of the optimal combination are discharged.

In the combination weighing apparatus 200, two measured weight values at maximum, corresponding to each double-chamber weighing hopper 26b, can be used in the combination calculation. Therefore, the number of combinations which become candidates for the optimal combination in the combination calculation is increased, compared to a case where the double-chamber weighing hoppers 26b are not provided. Specifically, for example, it is assumed that the optimal combination is formed by use of 4 measured weight values in the double shift operation. In this case, if the double-chamber weighing hoppers 26b are not provided, 10 out of 14 weighing hoppers participate in the combination calculation. The number of combinations to be compared in the combination calculation is $_{10}C_4=210$. In contrast, if the objects are fed to and held in all of the weighing chambers 26c, 26d of 4 double-chamber weighing hoppers 26b in the combination weighing apparatus 100, the number of the measured weight values is 18 at maximum. In the double shift operation, 4 measured weight values of 18 measured weight values are used in first combination calculation (combination calculation performed at first time). The number of combinations to be compared in the combination calculation is $_{14}C_4=1001$ at maximum. In accordance with the combination weighing apparatus 200, it is highly probable that the combination total weight which is closer to the combination target weight can be obtained. As a result, the weighing accuracy is improved.

In the example of FIG. 3, broken lines indicate virtual arrangement of the double-chamber weighing hoppers 26b in a case where all of the weighing hoppers 26 are the double-chamber weighing hoppers 26b. In that case, as can be seen from FIG. 3, the double-chamber weighing hoppers 26b interfere with each other and cannot be arranged. As possible options capable of solving this problem, the double-chamber weighing hoppers 26b are not provided, or the double-chamber weighing hoppers 26b are arranged at a larger pitch so that the double-chamber weighing hoppers 26b do not interfere with each other. However, in the former option, the weighing accuracy cannot be improved, while in the latter option, the size of whole of the combination weighing apparatus is increased.

In the combination weighing apparatus 200, each of the units 10 is the small unit 12 which includes the single-chamber weighing hopper 26a and does not include the double-chamber weighing hopper 26b, or the large unit 15 which does not include the single-chamber weighing hopper 26a and includes the double-chamber weighing hopper 26b. At least one small unit 12 is disposed between two large units 15 selected arbitrarily so that the large units 15 are not adjacent to each other in the circumferential direction. In this arrangement, the double-chamber weighing hoppers 26b can be disposed while preventing interference between the double-chamber weighing hoppers 26b. In this way, the double-chamber weighing hoppers 26b can be disposed without changing the pitch of the weighing hoppers 26. As a result, the weighing accuracy can be improved while preventing the increase in the size of the combination weighing apparatus.

Although in the example shown in FIG. 3, 4 double-chamber weighing hoppers 26b are provided, the double-chamber weighing hoppers 26b with a different number may be provided. The number of the double-chamber weighing hoppers 26b may be any of natural numbers which is ½ or less of the number of units. In other words, the number of the double-chamber weighing hoppers 26b may be set to an integer which is 1 or more and ½ or less of the number of units. For example, in a case where the number of the units 10 is 14 as shown in FIG. 3, the number of the double-chamber weighing hoppers 26b may be set to an integer which is 1 or more and 7 or less. The number of the double-chamber weighing hoppers 26b to be provided may be suitably set in view of a desired weighing accuracy, allowable cost, or the like.

Alternatively, by adjusting the positions (e.g., positions in the circumferential direction) of the double-chamber weighing hoppers 26b, some (one or more) of the large units 15 may be adjacent to each other in the circumferential direction.

Embodiment 3

In a combination weighing apparatus of Embodiment 3, which is according to the combination weighing apparatus of Embodiment 1, both of the condition (A) and the condition (B) are met. The combination weighing apparatus of Embodiment 3 includes the plurality of units arranged to form the circumference in the horizontal direction, each of the units includes the weighing hopper which holds, weighs, and discharges the objects, each of the units is the small unit or the large unit, and the combination weighing apparatus includes at least one small unit and at least one large unit. Each of the weighing hoppers is the single-chamber weighing hopper or the double-chamber weighing hopper. The small unit includes the single-chamber weighing hopper and does not include the double-chamber weighing hopper and the memory hopper. The large unit includes the double-chamber weighing hopper, does not include the single-chamber weighing hopper, and includes the memory hopper. At least one small unit is disposed between two large units selected arbitrarily in the circumference so that the large units are not adjacent to each other in the circumferential direction.

Alternatively, for example, by using the small units as some (one or more) of the units, and adjusting the positions of the large units in the circumferential direction, the large units may be adjacent to each other in the circumferential direction.

In a sixth combination weighing apparatus of Embodiment 3, which is according to the combination weighing apparatus of Embodiment 1, both of the condition (A) and the condition (B) are met, and the double-chamber weighing hopper includes two weighing chambers arranged adjacently to each other along the circumference, and the memory hopper includes two accommodating chambers arranged adjacently to each other along the circumference.

Figure 5:
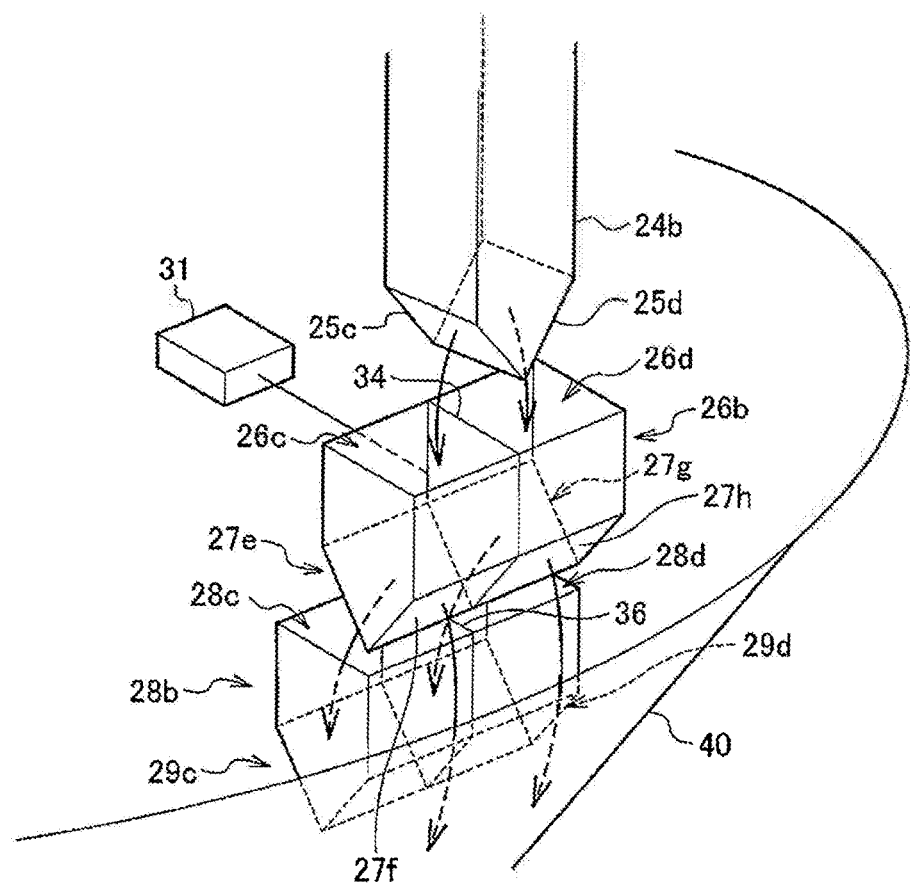
FIG. 5 is a schematic partial view showing a relation between a feeding hopper and a weighing hopper in a large unit of a combination weighing apparatus according to Embodiment 3.

FIG. 5 is a schematic partial view showing a relation between the feeding hopper and the weighing hopper in the large unit of the combination weighing apparatus according to Embodiment 3. As shown in FIG. 5, in the combination weighing apparatus of Embodiment 3, which is according to the combination weighing apparatus 200 of Embodiment 2, a memory hopper 28b is disposed below the double-chamber weighing hopper 26b. Specifically, the large unit 15 includes the double-chamber weighing hopper 26b, does not include the single-chamber weighing hopper 26a, and includes the memory hopper 28b. The small unit 12 includes the single-chamber weighing hopper 26a, and does not include the double-chamber weighing hopper 26b and the memory hopper 28b.

The memory hopper 28b includes a separating plate 36 in a center portion thereof. Accommodating chambers 28c, 28d are provided on both sides of this separating plate 36. In this configuration, the objects held in the accommodating chambers 28c, 28d are not mixed inside the memory hopper 28b. A gate 29c is provided below the accommodating chamber 28c. A gate 29d is provided below the accommodating chamber 28d. When the gate 29c is opened, the objects held in the accommodating chamber 28c are discharged. When the gate 29d is opened, the objects held in the accommodating chamber 28d are discharged.

The double-chamber weighing hopper 26b includes the separating plate 34 in a center thereof. The weighing chambers 26c, 26d are provided on both sides of this separating plate 34. In this configuration, the objects held in the weighing chambers 26c, 26d are not mixed inside the double-chamber weighing hopper 26b. Gates 27e, 27f are provided at the underside of the weighing chamber 26c. Gates 27g, 27h are provided at the underside of the weighing chamber 26d.

When the gate 27e is opened, the objects held in the weighing chamber 26c are discharged to the accommodating chamber 28c of the memory hopper 28b. When the gate 27f is opened, the objects held in the weighing chamber 26c are discharged to the collecting chute 40. When the gate 27g is opened, the objects held in the weighing chamber 26d are discharged to the accommodating chamber 28d of the memory hopper 28b. When the gate 27h is opened, the objects held in the weighing chamber 26c are discharged to the collecting chute 40.

Except the above, the apparatus configuration is similar to that of Embodiment 2, and therefore detained description is omitted.

Hereinafter, the operation of the combination weighing apparatus according to Embodiment 3 will be described with reference to the drawings. The operation described below may be performed, for example, in such a manner that the controller 50 executes programs stored in the memory section to control the constituents of the combination weighing apparatus.

The operation performed when the supply device supplies the objects to the feeding hopper and the feeding hopper feeds the objects to the weighing chamber is similar to that of embodiment 2 and will not be described in repetition.

When the accommodating chambers 28c, 28d of the memory hopper 28b, corresponding to the weighing chambers 26c, 26d of the double-chamber weighing hopper 26b, are empty, the double-chamber weighing hopper 26b opens the corresponding gates 27e, 27g to supply the objects to the accommodating chambers 28c, 28d. The measured weight values corresponding to the weighing chambers 26c, 26d are stored as the measured weight values corresponding to the accommodating chambers 28c, 28d.

The controller 50 performs the combination calculation by use of the measured weight values obtained for the single-chamber weighing hoppers 26a, the weighing chambers 26c, 26d of the double-chamber weighing hoppers 26b, and the accommodating chambers 28c, 28d of the memory hoppers 28b. The detail of the combination calculation is similar to that of Embodiment 1 and will not be described in repetition.

When the combination calculation completes, the controller 50 opens the gate 27a of the weighing hopper 26, the gates 27f, 27h of the weighing chambers 26c, 26d, and the gates 29c, 29d of the memory hoppers 28b, corresponding to the optimal combination, to discharge the objects to the collecting chutes 40.

After that, the objects are supplied to the weighing hopper 26, the weighing chambers 26c, 26d, and the accommodating chambers 28c, 28d which are empty. In the shown example, the double shift operation may be performed. In this case, while the objects are supplied to the weighing hopper 26, the weighing chambers 26c, 26d, and the accommodating chambers 28c, 28d, the controller 50 performs the combination calculation by use of the measured weight values corresponding to the weighing hoppers 26, the weighing chambers 26c, 26d, and the accommodating chambers 28c, 28d, which are other than the weighing hopper 26, the weighing chambers 26c, 26d, and the accommodating chambers 28c, 28d which are empty, and the objects of the optimal combination are discharged.

In the combination weighing apparatus of Embodiment 3, two measured weight values at maximum, corresponding to each double-chamber weighing hopper 26b, and two measured weight values at maximum corresponding to each memory hopper 28b, can be used in the combination calculation. Therefore, the number of combinations which become candidates for the optimal combination in the combination calculation is increased, compared to a case where the double-chamber weighing hoppers 26b and the memory hoppers 28b are not provided. Specifically, for example, it is assumed that the optimal combination is formed by use of 4 measured weight values in the double shift operation. In this case, if the double-chamber weighing hoppers 26b and the memory hoppers 28b are not provided, 10 out of 14 weighing hoppers participate in the combination calculation. The number of combinations to be compared in the combination calculation is $_{10}C_4$=210. In contrast, if the objects are fed to and held in all of the weighing chambers 26c, 26d of 4 double-chamber weighing hoppers 26b and all of the accommodating chambers 28c, 28d of 4 memory hoppers 28b in the combination weighing apparatus 100, the number of the measured weight values is 22 at maximum. In the double shift operation, 4 measured weight values of the 22 measured weight values are used in the first combination calculation (combination calculation performed at first time). The number of combinations to be compared in the combination calculation is $_{18}C_4$=3060 at maximum. In accordance with the combination weighing apparatus of Embodiment 3, it is highly probable that the combination total weight which is closer to the combination target weight can be obtained. As a result, the weighing accuracy is improved.

In the example of FIG. 3, broken lines indicate virtual arrangement of the double-chamber weighing hoppers 26b and the memory hoppers 28b in a case where all of the weighing hoppers 26 are the double-chamber weighing hoppers 26b and the memory hoppers 28b are provided below the double-chamber weighing hoppers 26b. FIG. 3 is a top plan view, and the memory hoppers 28b overlap with the double-chamber weighing hoppers 26b, respectively, and therefore are not shown. In that case, as can be seen from FIG. 3, the double-chamber weighing hoppers 26b interfere with each other, and the memory hoppers 28b interfere with each other. Therefore, the double-chamber weighing hoppers 26b and the memory hoppers 28b cannot be disposed. As possible options capable of solving this problem, the double-chamber weighing hoppers 26b and the memory hoppers 28b are not provided, or the double-chamber weighing hoppers 26b and the memory hoppers 28b are arranged at a larger pitch (pitch: distance from a center of a specified hopper to a center of adjacent hopper) so that the double-chamber weighing hoppers 26b do not interfere with each other and the memory hoppers 28b do not interfere with each other. However, in the former option, the weighing accuracy cannot be improved, while in the latter option, the size of the whole of the combination weighing apparatus is increased.

In the combination weighing apparatus according to Embodiment 3, each of the units 10 is the small unit 12 which includes the single-chamber weighing hopper 26a, and does not include the double-chamber weighing hopper 26b and the memory hopper 28b, or the large unit 15 which does not include the single-chamber weighing hopper 26a, and includes the double-chamber weighing hopper 26b and the memory hopper 28b. At least one small unit 12 is disposed between two large units 15 selected arbitrarily so that the large units 15 are not adjacent to each other in the circumferential direction. In this arrangement, the double-chamber weighing hoppers 26b and the memory chambers 28b can be disposed while preventing interference between the double-chamber weighing hoppers 26b and interference between the memory chambers 28b. In this way, the double-chamber weighing hoppers 26b and the memory hoppers 28b can be disposed without changing the pitch of the weighing hoppers. As a result, the weighing accuracy can be improved while preventing the increase in the size of the combination weighing apparatus.

Each of the number of the double-chamber weighing hoppers 26b and the number of the memory hoppers 28b are not particularly limited. Each of the number of the double-chamber weighing hoppers 26b and the number of the memory hoppers 28b may be any of natural numbers which is ½ or less of the number of units. In other words, each of the number of the double-chamber weighing hoppers 26b and the number of the memory hoppers 28b may be set to an integer which is 1 or more and ½ or less of the number of units. For example, in a case where the number of the units 10 is 14 as shown in FIG. 3, each of the number of the double-chamber weighing hoppers 26b and the number of the memory hoppers 28b may be set to an integer which is 1 or more and 7 or less. Each of the number of the double-chamber weighing hoppers 26b to be provided and the number of the memory hoppers 28b to be provided may be suitably set in view of a desired weighing accuracy, allowable cost, or the like. The number of the double-chamber weighing hoppers 26b and the number of the memory hoppers 28b may be different from each other.

The memory hoppers 28b may not be provided below some (one or more) of the double-chamber weighing hoppers 26b. It is not essential that the memory hopper disposed below the double-chamber weighing hopper 26b is the double-chamber memory hopper. Instead, a single-chamber memory hopper may be provided to correspond to only one of the weighing chambers.

Embodiment 4

In a manufacturing method of a seventh combination weighing apparatus, which has been altered, according to Embodiment 4, the combination weighing apparatus which meets the condition (B) of Embodiment 1 is manufactured by incorporating the memory hoppers corresponding to only some (one or more) of the weighing hoppers, into the existing combination weighing apparatus to be altered, which includes a plurality of units arranged to form a circumference in a horizontal direction, in which each of the units includes the weighing hopper which holds, weighs, and discharges the objects, and does not include the memory hopper which is disposed below the weighing hopper, holds the objects discharged from the weighing hopper and discharges the objects.

In a manufacturing method of an eighth combination weighing apparatus, which has been altered, according to Embodiment 4, the combination weighing apparatus which meets the condition (B) of Embodiment 1 is manufactured by incorporating the memory hoppers in such a manner that both of two adjacent units do not include the memory hoppers, into the existing combination weighing apparatus to be altered, which includes a plurality of units arranged to form a circumference in a horizontal direction, in which each of the units includes the weighing hopper which holds, weighs, and discharges the objects, and does not include the memory hopper which is disposed below the weighing hopper, holds the objects discharged from the weighing hopper and discharges the objects.

In the above-described manufacturing method, the measured weight values can be increased by incorporating the memory hoppers into (adding the memory hoppers to) the existing combination weighing apparatus. Therefore, it becomes possible to easily obtain the combination weighing apparatus which is compact and has a high performance, at low cost.

Each of the weighing hoppers included in the existing combination weighing apparatus, to be altered, may be configured to selectively discharge the objects to a proximal region or a distal region, with respect to a center of the circumference (to a region which is more distant from the center of the circumference or to a region which is closer to the center of the circumference).

In a manufacturing method of a ninth combination weighing apparatus, which has been altered, according to Embodiment 4, the manufacturing method of the ninth combination weighing apparatus being according to the above-described manufacturing method of the seventh or eighth combination weighing apparatus, which has been altered, the vertical positions of the units are changed in such a manner that the upper ends of the weighing hoppers of the altered combination weighing apparatus including the memory hoppers are higher than the upper ends of the weighing hoppers in the existing combination weighing apparatus to be altered. This makes it possible to suppress an increase in the diameters of the whole of the collecting chutes while preventing interference between the memory hoppers and the collecting chutes.

In a manufacturing method of a tenth combination weighing apparatus, which has been altered, according to Embodiment 4, the manufacturing method of the tenth combination weighing apparatus being according to any one of the above-described manufacturing methods of the seventh to ninth combination weighing apparatuses, which have been altered, each of the existing combination weighing apparatus to be altered and the altered combination weighing apparatus includes a plurality of collecting chutes corresponding to the plurality of units, respectively, and the positions of the collecting chutes are changed in such a manner that the upper ends of the collecting chutes corresponding to the memory hoppers of the altered combination weighing apparatus including the memory hoppers are more distant from the vertical axis 80 passing through the center of the circumference than the upper ends of the collecting chutes of the combination weighing apparatus to be altered. This makes it possible to suppress an increase in the size of the whole of the combination weighing apparatus while adjusting the positions of the collecting chutes corresponding to the large units to prevent interference between the memory hoppers and the collecting chutes.

Figure 6A:
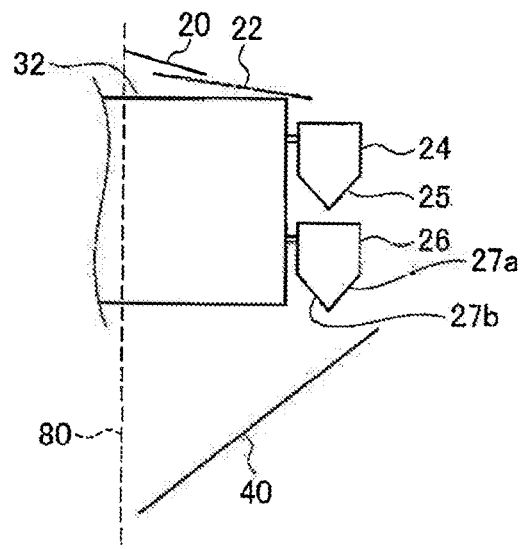
FIG. 6A is a schematic cross-sectional view showing the schematic configuration of an unaltered combination weighing apparatus in a manufacturing method of an altered combination weighing apparatus according to Embodiment 4.
Figure 6B:
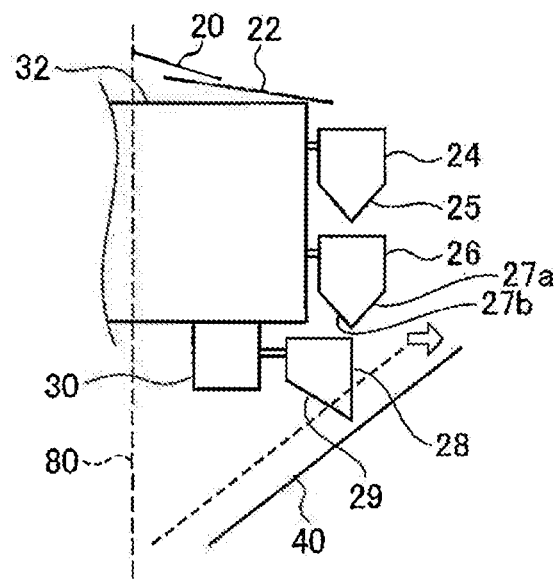
FIG. 6B is a schematic cross-sectional view showing the schematic configuration of the altered combination weighing apparatus in the manufacturing method of the altered combination weighing apparatus according to Embodiment 4.

FIG. 6A is a schematic cross-sectional view showing the schematic configuration of an unaltered combination weighing apparatus in the manufacturing method of the altered combination weighing apparatus according to Embodiment 4. FIG. 6B is a schematic cross-sectional view showing the schematic configuration of the altered combination weighing apparatus in the manufacturing method of the altered combination weighing apparatus according to Embodiment 4.

Hereinafter, the manufacturing method of the altered combination weighing apparatus according to Embodiment 4 will be described with reference to the drawings.

As shown in FIG. 6A, the configuration of the unaltered combination weighing apparatus may be similar to a configuration in which the memory hoppers 28 are omitted from the combination weighing apparatus 100 of Embodiment 1. Specifically, the unaltered combination weighing apparatus includes the plurality of units 10 arranged to form the circumference in the horizontal direction, and each of the units 10 includes the weighing hopper 26 and does not include the memory hopper 28.

The configuration of the weighing hopper 26 is not particularly limited. For example, the weighing hopper 26 may be either the single-chamber weighing hopper including the single accommodating chamber for holding the objects, or the double-chamber weighing hopper including two accommodating chambers. All of the units 10 may include the double-chamber weighing hoppers. In this configuration, by providing the memory hoppers corresponding to some (one or more) of the units, the number of the measured weight values can be increased while preventing the increase in the size of the apparatus.

As shown in FIG. 6B, in the manufacturing method of the altered combination weighing apparatus of Embodiment 4, the memory hoppers 28 are provided to correspond to the weighing hoppers 26 of some (one or more) of the units 10, rather than the weighing hoppers 26 of all of the units 10. In this case, as shown in FIG. 6B, both of two adjacent units 10 do not include the memory hoppers. In the shown example, the drive units 30 are provided together with the memory hoppers 28. The drive units 30 are fastened to the lower end surface of the center column 32 by, for example, screws. An opening is provided between each of the drive units 30 and the center column 32. Through this opening, a power cable, a signal cable, and the like are provided. Since the memory hoppers 28 are incorporated, the operation programs stored in the controller 50 may be changed.

In the example shown in FIG. 6B, the collecting chutes 40 are provided to correspond to the units, respectively. In the combination weighing apparatus into which the memory hoppers 28 are incorporated, the positions of the collecting chutes 40 are changed in such a manner that the upper ends of the collecting chutes 40 corresponding to the large units 14 including the memory hoppers 28 are more distant from the vertical axis 80 passing through the center of the circumference than the upper ends of the collecting chutes 40 of the combination weighing apparatus to be altered, in order to prevent interference between the incorporated memory hoppers 28 and the existing collecting chutes 40. Note that the existing members or new members may be used, as the collecting chutes 40 corresponding to the large units 14 including the memory hoppers 28.

Figure 6C:
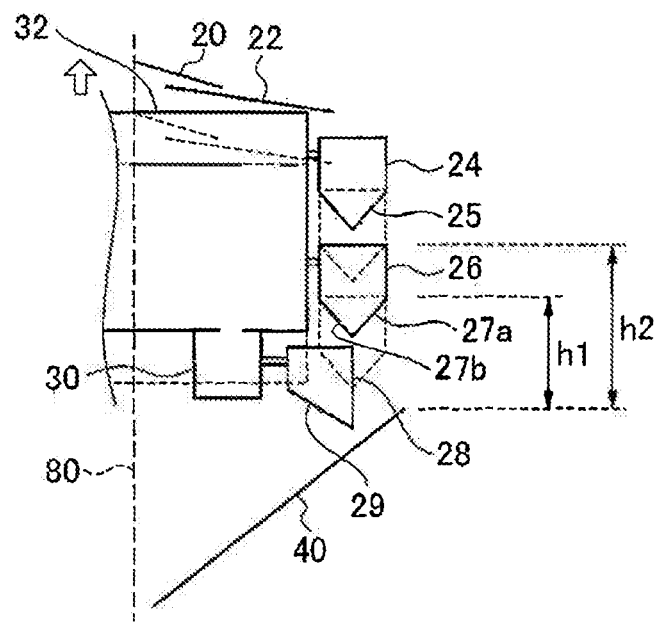
FIG. 6C is a schematic cross-sectional view showing the schematic configuration of an altered combination weighing apparatus in a manufacturing method of the altered combination weighing apparatus according to Modified Example of Embodiment 4.

FIG. 6C is a schematic cross-sectional view showing the schematic configuration of an altered combination weighing apparatus in a manufacturing method of the altered combination weighing apparatus according to Modified Example of Embodiment 4.

In the example shown in FIG. 6C, the vertical positions of the units 10 (center column 32) including the memory hoppers are changed so that the upper ends of the weighing hoppers 26 of the altered combination weighing apparatus are higher than the upper ends of the weighing hoppers 26 of the existing combination weighing apparatus to be altered, to prevent interference between the incorporated memory hoppers 28 and the existing collecting chutes 40. The height of the upper end of the weighing hopper 26 may be the height from the upper end of the collecting chute 40. Specifically, the height h2 of the upper end of the weighing hopper 26 of the altered combination weighing apparatus is more than the height h1 of the upper end of the weighing hopper 26 of the existing combination weighing apparatus to be altered (h2>h1). This change can be realized by, for example, changing the structure of a center base body supporting the combination weighing apparatus.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

LIST OF REFERENCE CHARACTERS 10 unit
12 small unit
14, 15 large unit
20 top cone
22 linear feeder
24, 24b feeding hopper
25, 25c, 25d gate
26 weighing hopper
26a single-chamber weighing hopper
26b double-chamber weighing hopper
26c, 26d weighing chamber
27a, 27b, 27c, 27d, 27e, 27f, 27g, 27h gate
28, 28b memory hopper
28c, 28d accommodating chamber
29, 29c, 29d gate
30 drive unit
31 weighing sensor
32 center column
34, 36 separating plate
40 collecting chute
50 controller
80 vertical axis
100, 200 combination weighing apparatus

The invention claimed is:

1. A combination weighing apparatus including a plurality of units arranged to form a circumference in a horizontal direction,
wherein the plurality of units include weighing hoppers, respectively, each of the weighing hoppers being configured to hold, weigh and discharge objects, and each of the plurality of units is a small unit or a large unit, the combination weighing apparatus comprising:
- at least one small unit;
- at least two large units; and
- a controller which performs a combination calculation by use of measured weight values corresponding to the small unit and the large unit,
- wherein the combination weighing apparatus meets at least one of the following two conditions (A) and (B), and the at least one small unit is disposed between two large units selected arbitrarily in the circumference so that the large units are not adjacent to each other in a circumferential direction,
  - condition (A) in which each of the weighing hoppers is a single-chamber weighing hopper or a double-chamber weighing hopper, the small unit includes the single-chamber weighing hopper and does not include the double-chamber weighing hopper, and the large unit includes the double-chamber weighing hopper and does not include the single-chamber weighing hopper, and
  - condition (B) in which some of the plurality of units include memory hoppers each of which is disposed below the weighing hopper, holds the objects discharged from the weighing hopper and discharges the objects, the small unit does not include the memory hopper, and the large unit includes the memory hopper.

2. The combination weighing apparatus according to claim 1,
- wherein the combination weighing apparatus meets the condition (B), and
- wherein a plurality of collecting chutes are provided to correspond to the plurality of units, respectively.

3. The combination weighing apparatus according to claim 1,
- wherein the combination weighing apparatus meets the condition (B), and
- wherein each of the weighing hoppers corresponding to the memory hoppers selectively discharges the objects to a proximal region or a distal region, with respect to a center of the circumference.

4. The combination weighing apparatus according to claim 1,
- wherein the combination weighing apparatus meets the condition (A), and
- wherein the double-chamber weighing hopper includes two weighing chambers arranged adjacently to each other along the circumference.

5. A method of manufacturing an altered combination weighing apparatus, the method comprising:
- manufacturing the combination weighing apparatus which meets the condition (B) of claim 1, by incorporating the memory hoppers corresponding to only some of the weighing hoppers, into an existing combination weighing apparatus to be altered, the existing combination weighing apparatus including the plurality of units arranged to form the circumference in the horizontal direction, in which each of the units includes the weighing hopper which holds, weighs, and discharges the objects, and does not include the memory hopper which is disposed below the weighing hopper, holds the objects discharged from the weighing hopper and discharges the objects.

6. A method of manufacturing an altered combination weighing apparatus, the method comprising:
- manufacturing the combination weighing apparatus which meets the condition (B) of claim 1, by incorporating the memory hoppers in such a manner that both of two adjacent units do not include the memory hoppers, into an existing combination weighing apparatus to be altered, which includes the plurality of units arranged to form the circumference in the horizontal direction, in which each of the units includes the weighing hopper which holds, weighs, and discharges the objects, and does not include the memory hopper which is disposed below the weighing hopper, holds the objects discharged from the weighing hopper and discharges the objects.

7. The method according to claim 6,
- wherein each of the existing combination weighing apparatus to be altered and the altered combination weighing apparatus includes a plurality of collecting chutes corresponding to the plurality of units, respectively, and
- wherein positions of the collecting chutes are changed in such a manner that upper ends of the collecting chutes corresponding to the memory hoppers of the altered combination weighing apparatus including the memory hoppers are more distant from a vertical axis passing through a center of the circumference than upper ends of the collecting chutes of the existing combination weighing apparatus to be altered.

8. The method according to claim 6,
- wherein vertical positions of the units including the memory hoppers are changed in such a manner that upper ends of the weighing hoppers of the altered combination weighing apparatus are higher than upper ends of the weighing hoppers of the existing combination weighing apparatus to be altered.

9. The method according to claim 7,
- wherein vertical positions of the units including the memory hoppers are changed in such a manner that upper ends of the weighing hoppers of the altered combination weighing apparatus are higher than upper ends of the weighing hoppers of the existing combination weighing apparatus to be altered.

10. The combination weighing apparatus according to claim 2,
- wherein each of the weighing hoppers corresponding to the memory hoppers selectively discharges the objects to a proximal region or a distal region, with respect to a center of the circumference.

11. The combination weighing apparatus according to claim 2,
- wherein the combination weighing apparatus meets the condition (A), and
- wherein the double-chamber weighing hopper includes two weighing chambers arranged adjacently to each other along the circumference.

12. The combination weighing apparatus according to claim 3,
- wherein the combination weighing apparatus meets the condition (A), and
- wherein the double-chamber weighing hopper includes two weighing chambers arranged adjacently to each other along the circumference.

13. The combination weighing apparatus according to claim 10,
- wherein the combination weighing apparatus meets the condition (A), and
- wherein the double-chamber weighing hopper includes two weighing chambers arranged adjacently to each other along the circumference.

* * * * *